United States Patent [19]

Günther et al.

[11] 4,442,611
[45] Apr. 17, 1984

[54] AIR LOCK, PARTICULARLY TO PERMIT DRYING OF A PRINTED WEB IN A CONTROLLED ATMOSPHERE

[75] Inventors: Siegfried Günther, Munich; Cohann Winterholler, Friedberg, both of Fed. Rep. of Germany

[73] Assignee: M.A.N.-Roland Druckmaschinen Aktiengesellschaft, Offenbach am Main, Fed. Rep. of Germany

[21] Appl. No.: 422,380

[22] Filed: Sep. 24, 1982

Related U.S. Application Data

[63] Continuation of Ser. No. 237,576, Feb. 23, 1981, abandoned.

[30] Foreign Application Priority Data

Mar. 8, 1980 [DE] Fed. Rep. of Germany ....... 3009019

[51] Int. Cl.³ .................................................. F26B 25/08
[52] U.S. Cl. ........................................ 34/41; 34/242; 34/156; 432/242; 68/5 E; 118/642
[58] Field of Search ................... 34/4, 41, 242, 155, 34/156; 432/242; 68/5 E; 118/58, 68, 642, 643

[56] References Cited

U.S. PATENT DOCUMENTS

| | | | |
|---|---|---|---|
| 3,826,014 | 7/1974 | Helding | 34/41 |
| 4,087,992 | 5/1978 | Sando et al. | 34/242 |
| 4,268,977 | 5/1981 | Geiger | 34/242 |

FOREIGN PATENT DOCUMENTS 676259 5/1939 Fed. Rep. of Germany

*Primary Examiner*—Larry I. Schwartz
*Attorney, Agent, or Firm*—Frishauf, Holtz, Goodman & Woodward

[57] ABSTRACT

To effectively seal the atmosphere within a chamber against ambient atmosphere, particularly for drying or curing of printing ink by UV radiation, vacuum drying, or the like, a pair of plates (12, 13; 33, 34) are positioned contiguous with a pass-through slit formed in a side wall (6) of the chamber, the plates being formed with recesses, grooves or depressions (7-11; 29) extending transversely to movement of the paper web. Ambient air is conducted at the lateral sides to the recesses or grooves which, preferably, in cross section are circular and formed as semicircular grooves in the respective plates, and suction is applied essentially centrally, with respect to the width of the web (2, 40) by suction pumps (19, 23) which may apply an increading degree of vacuum to the recesses as the wall (6) of the chamber is approached. The width of the ridges adjacent the grooves or recesses can be determined by replaceable strips (35', 36') or by eccentric rollers (34, 35) so that the width of the pass-through slit between the plates can be matched to the thickness of the paper web (2, 40).

12 Claims, 3 Drawing Figures

AIR LOCK, PARTICULARLY TO PERMIT DRYING OF A PRINTED WEB IN A CONTROLLED ATMOSPHERE

This is a continuation, of application Ser. No. 237,576 filed Feb. 23, 1981 now abandoned.

The present invention relates to an air lock, and more particularly to separate ambient air from a confined space within a chamber while permitting movement of printed web material, typically paper, from ambient air into the chamber and out again; the structure is especially suited for drying or hardening of the printing ink on freshly printed paper.

Background

Freshly printed paper can be handled easier if the ink is dried rapidly. German Pat. No. 676,259 describes a drying arrangement for intaglio printing in which a paper web is drawn through a box-like chamber which has slit-like openings at opposed sides. Blower nozzles and suction nozzles are located close to the path of the paper web positioned transverse to its transport direction. The gas which is emitted by the blower nozzles, after contacting the paper web, is sucked up by the next adjacent suction nozzle. Upon drying, printing ink emits chemically loaded vapors. To prevent escape of solvents used in printing ink, such as xylol and toluol, suction nozzles only are located at the ends of the box.

Access to the various nozzles located within the box is difficult. It has been found that the nozzles do not provide for sufficient sealing of the entrance and exit slots. Further, guidance of the paper web is difficult since the suction nozzles in the region of the entrance and exit slits have the tendency to pull the paper web thereagainst. This is undesirable, particularly at the entrance slit which receives the freshly printed paper. Such an arrangement hardly permits operation with vacuum since the nozzles pull in air from the adjacent ambient or surrounding atmosphere, making evacuation of the interior of the box very difficult.

The Invention

It is an object to provide a lock to permit introduction into, or removal from, a box-like chamber of web-like materials, in which the interior of the atmosphere of the box is effectively separated from ambient air, preferably close to a hermetic separation. Such a box can be used either as a vacuum or gas chamber for drying or hardening of printing ink, in which escape of gaseous media from the box via the inlet and outlet slits is effectively prevented; or to operate the box under vacuum in which introduction of surrounding atmospheric air is effectively prevented while, additionally, preventing escape of radiation or radiated particles which may be generated within the box.

Briefly, two plate elements are positioned parallel to each other and spaced from each other to form a web passage slit outside of, and contiguous to, the slits into the chamber; each of the plate elements is formed with essentially similarly shaped and sizes recesses, grooves or depressions therein, extending essentially transversely to the direction of movement of the web, that is, essentially parallel to the direction of the opening slit in the chamber. Suction only is supplied to the recesses above and below the web, so that air leaking through the slit into the web passage will be drawn away from both above as well as below the web.

Preferably, a plurality, for example five, of these recesses are serially arranged in the plates. Locating the plates outside of the side walls of the chamber has the effect that the plates act as air throttles or chokes. The symmetrical construction of the recesses or grooves at both sides of the plates which form a web transport guide path or track permits accurate guiding of the paper web. This is particularly important when introducing freshly printed paper web into the chamber, since smearing of ink is avoided.

In accordance with a preferred feature of the invention, at least one of the plates is constructed such that it can pivoted away from the position opposite the other; preferably, the upper plate can be so pivoted, so that the recesses or grooves and suction zones are readily accessible, for example for cleaning, removal of fluff, or the like.

The distances of separation of the two plates from each other, defining the width or gap of the slit, permit matching the width of the slit to different thicknesses of paper web to be used, for example by placing spacer elements of suitable size adjacent the ridges which will be left between the recesses formed in the plates; rather than placing differently sized spacer elements at those ridges, eccentrically mounted rollers can be used so that simple rotation of the rollers will more or less constrict the slit between the plates at the positions at the entrance to the plates, the exit, and the intermediate ridges between the transverse recesses, grooves, or depressions. Sealing of the eccentric cylinder is simple, by an elastic sealing strip adjacent the cylinder which is more or less compressed as the cylinder is rotated for positioning and accurately sizing the gap between the plates.

DRAWINGS

Figure 1:
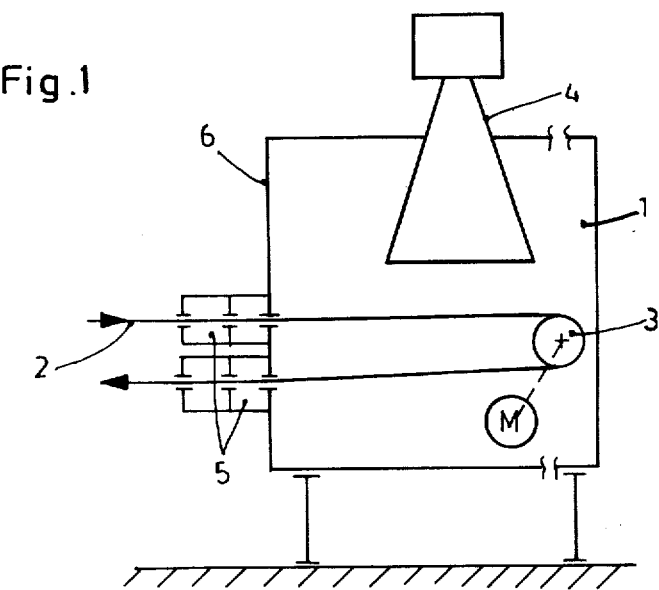
FIG. 1 is a highly schematic view of the apparatus with a web entrance lock and an exit lock.

The chamber 1 (FIG. 1) is defined by a box 6 which has a paper web 2 introduced thereinto, and removed therefrom. The paper web 2, for example, may have been printed by offset printing. It is guided around a reversing deflection roller 3 positioned within the chamber 1.

To polymerize printing ink, a high-energy radiation source, for example an ultraviolet (UV) source 4 is positioned in the chamber 1. Printing ink printed on the web 2 frequently uses ink which can be set or hardened by polymerization upon exposure to ultraviolet light or other energy radiation. Inks of this type are, for example, acrylic inks. The radiation source 4 need not be a UV radiator; electron guns can also be used within the chamber 1. Hardening or curing of rapidly polymerizable printing ink by high-energy radiation requires an inert gas within the chamber 1 or a vacuum, since the materials of the ink are incompatible with oxygen. Operation in normal, ambient atmosphere thus is not possible.

To carry out polymerization of inks which, for rapid curing, have to be removed from oxygen-containing atmospheres, locks 5 are located at a side wall 6 defining the chamber 1 to form entrance and exit locks therefor. The thermodynamic conditions, as well as the composition of the atmosphere within the chamber, or the vacuum therein, can be controlled by use of the locks 5, since the locks 5 function similar to choke or throttle elements with respect to flow mechanics relationships. Chamber 1 can also be used for vacuum drying of ink on webs to which ink has been applied by intaglio printing. Such ink usually contains toluol as a solvent, and chamber 1 must then be capable of retaining therein an atmosphere which permits evaporation of the toluol. Drying of the ink, that is, evaporation of the toluol, can be done as well known and customary, by using thermally effective radiating dryers. The locks or traps 5 permit operation of toluol-containing ink in a vacuum drying process which, as known, is an effective drying process using only little external energy. Drying can be carried out in a closed system. Thus, the toluol vapors will not escape from the chamber 1 to cause environmental damage; rather, the toluol can be recuperated from the atmosphere within the chamber 1 for recycling and re-use of the solvent.

Sealing problems for the drive of the roller or cylinder 3 can be avoided by positioning the dryer motor M within the confines of the chamber 1.

Figure 2:
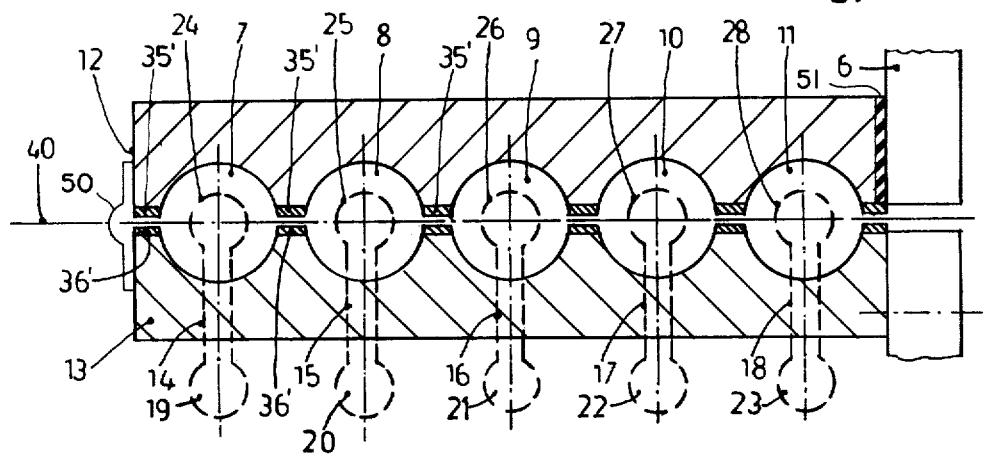
FIG. 2 is a highly schematic longitudinal sectional view through a lock with slit adjustment by spacer elements or strips.
Figure 3:
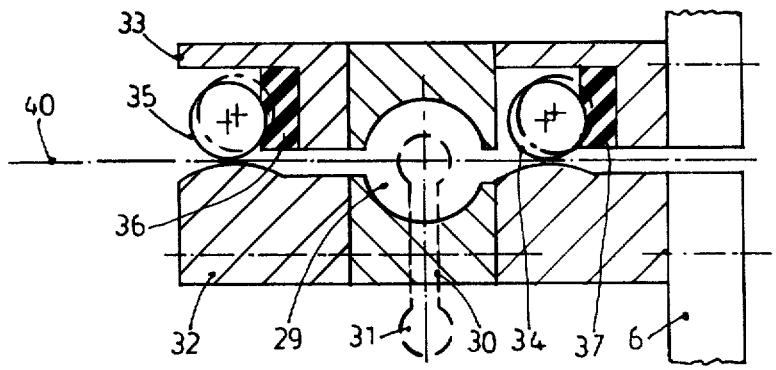
FIG. 3 is a schematic longitudinal view through a lock using an eccentric roller to adjust the width of the entrance slit, in which only one suction recess is shown for simplicity.

The air locks 5 are best seen, in cross section, in FIGS. 2 and 3. FIG. 2 shows a portion of the side wall 6 of the chamber 1. The air lock as illustrated in FIG. 2 defines an entrance slit between two plates 12, 13. The plates 12, 13 are formed with recesses defining five suction stages 7, 8, 9, 10, 11. The suction stages 7-11 are formed as suction grooves or recesses of circular cross section extending transversely to the direction of transport of the paper web. The suction stages 7-11 are located, respectively, in the form of half-circular grooves on the respective upper and lower plates 12, 13. Preferably, plate 13, that is, the lower portion, is secured to the side wall 6, for example by welding. The upper plate 12 and the lower plate 13 are spaced from each other and positioned parallel with respect to each other. The lateral edges—not visible in FIG. 2—are sealed. A slit of predetermined width will thus be obtained between the plates 12, 13. The suction spaces 7-11 are readily accessible by removal or tipping away of plate 12. Hinges 50, located laterally of the entrance slit for the web 40 (FIG. 2) permit tipping away of the top plate 12. The edge of the plate 12 fitting against the wall 6 of the chamber 1 is formed with an elastic sealing element 51 so that, in the position shown in FIG. 2, plate 12 will be effectively sealed against the side wall 6. The suction spaces 7-11, circular in cross section, each are formed by semi-circular recesses or grooves in the respective upper and lower plates 12, 13.

A suction line 14, 15, 16, 17, 18 is respectively connected to each one of the suction stages 7-11; each one of the suction lines 14-17 is respectively connected to a suction pump 19, 20, 21, 22, 23, or to a vacuum manifold. Suction air is drawn by the suction pump, so that a continuous air stream is generated transversely to the plane of the paper web and through the paper web, is supplied over lateral connection stubs 24, 25, 26, 27, 28, communicating, respectively, with the suction spaces 7-11. The air suction is, preferably, provided by positioning the stubs 24-28 laterally, in sealed relationship to the plates 12, 13, such that suction air is withdrawn essentially to the center of the cylindrical suction spaces 7-11. The air stubs 24-28 preferably are circular connections coaxially placed with respect to the suction spaces 7-11.

The adjustment of the width of the slit is obtained by placing metal strips or lips 35', 36' in the region between the grooves, that is, on the ridges which are left in the plates 12, 13 between the suction grooves 7-11. These lips are in the form of metal strips; strips of different thicknesses or with shims can be provided to define the width of the slit of the air lock. Thus, the width of the web passing through the air lock can be matched to the thickness of the paper web 40 being conducted into the chamber 1.

Operation: the width of the slit is arranged to be slightly wider than the thickness of the web 40. Applying suction air, causes flow of gaseous medium into the center of the suction stubs; this provides for effective guidance of the paper web. Preferably, the stubs or connections 14-18 are located essentially centrally—with respect to a the thickness dimension of web 40—of the plates. The paper thus can be guided to be positioned essentially in the center of the slit between the plates 12, 13, without contact with either one of the plates. Air will be drawn in through the slit 36 by the suction spaces 7-11 connected to the suction pumps 19-23.

The suction pumps 19-23 can be so constructed that the suction effectiveness of the respective pumps differs; preferably, the vacuum generated by the respective pumps should increase towards the wall 6 of the chamber 1. The suction spaces 7-11 additionally prevent escape of radiation which may be generated within the chamber; beta rays, for example, are effectively blocked from ambient atmosphere.

Embodiment of FIG. 3: Essentially, the embodiment of FIG. 3 is similar to that of FIG. 2 and can be used on the side wall of either a gas, such as an inert gas chamber or a vacuum chamber; it can be used as an entrance or as an exit lock. Only a single suction stage 29 is shown for simplicity although a plurality of stages, as in FIG. 2, is preferred. The difference between the embodiment of FIGS. 1 and 2 is the adjustment of the size of the slit.

The suction stage 29 likewise has a circular cross section, connected over a suction line 30 with a vacuum pump 31. The lower plate 32 as well as the upper plate 31 are made of several plate elements; this facilitates manufacture. The different plate elements are shown by differently directed cross hatching. The upper plate unit 33 can be pivoted with respect to the lower unit 32, or made slidable with respect thereto for easy removal to permit access to the chamber 29.

The entrance and exit openings of the lock are defined by the position of eccentrically retained rollers 34, 35. By rotating the respective rollers 34, 35 in eccentric bearing holders, the height of the slit defined between the circumference of the respective roller 34, 35 and the counter surface of the element 32 can be adjusted. Preferably, the surface of unit 32 is slightly bulged in the direction of the respective eccenter roller 34, 35, as seen in FIG. 3. Effective sealing is obtained by positioning an elastic sealing strip 36, 37 adjacent each one of the eccentrically placed rollers 34, 35. The sealing strips can be made of an elastomer. The rollers 34, 35, over the entire length, sealingly engage the elastic strips 36, 37. The height of adjustment, by eccentric positioning, is indicated, respectively, by the two center marks associated with the rollers 34, 35, and by the full-line and chain-dotted line position thereof, respectively. By rotating the rollers 34, 35, the width of the slit through which the web 40 can pass is adjustable.

Adjustment of the width of the slit in the embodiment of FIG. 3 can be automated by providing servo motors for rotation of the rollers 34, 35 or a single motor and coupling the rollers 34, 35 together, for example by a chain belt or the like.

Various changes and modifications may be made, and features described in connection with one of the embodiments may be used with the other, within the scope of the inventive concept.

We claim:

1. Air lock to separate ambient air from a confined space (1) within a chamber permitting non-contacting movement of a web between the ambient air and the confined space, particularly for movement of freshly printed paper web subject to smearing into and out of said chamber defining the confined space, in which vacuum or gas compositions prevail which differ from ambient atmospheric condition or composition and especially for hardening, curing or drying of printing ink on a paper web, comprising two plate elements (12, 13; 32, 33) positioned parallel to each other and spaced from each other to form a web passage slit which is contiguous with a pass-through slit into the chamber, to permit passage of the web through the slit and into the chamber, each of said plate elements being formed with a plurality of essentially similarly shaped and dimensioned, symmetrical grooves or recesses, or depressions (7-11; 29) extending transversely to the direction of movement of the web, mutually aligned and positioned symmetrically with respect to the pass-through slit into the chamber and located along the path of travel of the web from outer edges of the plates to the pass-through slit;

and means (14-23) for exclusively providing suction, communicating with the recesses of both of the plates to apply equal suction to the web both from the top as well as the bottom thereof and thereby draw air leaking through said slit into said web passage above the web and below the web;

said plates being sealed laterally of said slit to confine the suction to the slit;

the two plate elements being positioned immediately adjacent the pass-through slit of the chamber, and sealed to the side wall (6) of the chamber to form an air throttle or choke with respect to air communication between the chamber and ambient air.

2. Air lock according to claim 1, wherein said grooves, recesses or depressions (7-11; 29) are formed as semi-circular grooves, recesses or depressions in the respective plate elements (12, 13; 32, 33).

3. Air lock according to claim 2, wherein the suction means comprise suction supply means (19-23; 31) and connection means (14-18, 24-28; 30) communicating with the suction supply means and positioned laterally concentrically with respect to the circular grooves, recesses or depressions (7-11; 29) to apply said suction to the grooves, recesses or depressions in both of the plates and hence uniformly to both sides of the web in the slit.

4. Air lock according to claim 1, wherein one of said plate elements is rigidly secured to a side wall (6) of the chamber;

the other wall element is pivotably positioned with respect to the rigidly secured plate element to permit removal of said plate elements from parallel position and provide access to said grooves, recesses or depressions (7-11; 29);

and means (51) sealing the pivotably secured plate element against the side wall (6) of the chamber when in said parallel position.

5. Air lock according to claim 1, further including an energy emitting radiation source (4) positioned within the chamber (1) to provide radiation for curing of offset printing ink on the web (2, 40).

6. Air lock according to claim 1, further including a radiating dryer (4) positioned within the chamber for drying of printing ink applied to the paper web (2, 40) by intaglio printing.

7. Air lock according to claim 1, further including removable strips (35', 36') of relatively different thickness positionable on the plate elements in the region between the grooves, recesses or depressions to define the width of the slit between the plate elements and to permit matching the width of the slit to the thickness of the web (2, 40).

8. Air lock according to claim 1, further including slit adjustment rollers (34, 35) positioned at both sides adjacent the grooves, recesses or depressions and located transversely to the direction of movement of the web (2, 40), said rollers defining the width of the slit through which the web (2, 40) can pass.

9. Air lock according to claim 1, wherein;

the suction means (14-23) apply suction to the grooves or recesses close to said chamber which is higher than the suction being applied to the grooves or recesses located remotely from the chamber.

10. Air lock according to claim 9, wherein said rollers are eccentrically retained in the respective plate element (33) to permit relative adjustment of the distance of the surface of the roller with respect to the opposed surface of the other plate element;

and a sealing strip (36, 37) sealing the eccentrically retained rollers with respect to the plate element.

11. Air lock according to claim 10, wherein the sealing strip (36, 37) comprises resiliently compressible elastomer material.

12. Air lock according to claim 10, wherein one of the plate elements (33) has said eccentrically retained rollers positioned therein;

and the other plate element is formed with a convex bowed or curved surface opposite the respective roller to define a slit with respect thereto which has curved surfaces at both sides of the narrowest portion of the slit.

* * * * *